(12) United States Patent
Szpak et al.

(10) Patent No.: US 8,181,150 B2
(45) Date of Patent: *May 15, 2012

(54) SYSTEM AND METHOD FOR SYNCHRONIZED WORKFLOW MANAGEMENT

(75) Inventors: Peter Szpak, Newton, MA (US); Paulo Pacheco, Westport, MA (US); Christian Robl, Offenberg (DE); Martin Orehek, Munich (DE)

(73) Assignee: The MathWorks, Inc., Natick, MA (US)

( * ) Notice: Subject to any disclaimer, the term of this patent is extended or adjusted under 35 U.S.C. 154(b) by 1102 days.

This patent is subject to a terminal disclaimer.

(21) Appl. No.: 11/432,939

(22) Filed: May 12, 2006

(65) Prior Publication Data

US 2007/0266368 A1 Nov. 15, 2007

(51) Int. Cl.
*G06F 9/44* (2006.01)
(52) U.S. Cl. ........ 717/104; 717/105; 717/106; 717/107; 717/110; 717/135
(58) Field of Classification Search .................. 717/100, 717/101, 104, 105, 106, 109, 110, 113
See application file for complete search history.

(56) References Cited

U.S. PATENT DOCUMENTS

| | | | | |
|---|---|---|---|---|
| 6,038,393 | A * | 3/2000 | Iyengar et al. | 717/104 |
| 6,237,020 | B1 * | 5/2001 | Leymann et al. | 709/201 |
| 6,292,933 | B1 * | 9/2001 | Bahrs et al. | 717/107 |
| 6,339,838 | B1 * | 1/2002 | Weinman, Jr. | 717/104 |
| 6,405,364 | B1 | 6/2002 | Bowman-Amuah | |
| 6,473,794 | B1 * | 10/2002 | Guheen et al. | 709/223 |
| 6,499,023 | B1 | 12/2002 | Dong et al. | |
| 6,507,844 | B1 * | 1/2003 | Leymann et al. | 707/8 |
| 6,536,037 | B1 * | 3/2003 | Guheen et al. | 717/151 |
| 6,636,242 | B2 * | 10/2003 | Bowman-Amuah | 715/764 |
| 6,772,407 | B1 * | 8/2004 | Leymann et al. | 717/100 |
| 6,782,379 | B2 | 8/2004 | Lee | |
| 6,973,626 | B1 * | 12/2005 | Lahti et al. | 715/763 |
| 7,272,820 | B2 | 9/2007 | Klianev | |
| 7,305,656 | B2 * | 12/2007 | Fish et al. | 717/105 |
| 7,349,837 | B2 * | 3/2008 | Martin et al. | 703/22 |
| 7,370,325 | B1 * | 5/2008 | Hull et al. | 718/102 |

(Continued)

FOREIGN PATENT DOCUMENTS

EP 0747804 B1 12/1996

(Continued)

OTHER PUBLICATIONS

Title: The Research of a New Workflow Model with Step-Task Layers Based on XML Documents, author Xing Jianping, et al, souce: IEEE, dated: Dec. 18, 2006.*

(Continued)

*Primary Examiner* — Chameli Das
(74) *Attorney, Agent, or Firm* — Nelson Mullins Riley & Scarborough LLP

(57) ABSTRACT

A workflow manager that offers structure and control over the graphical modeling environment so that the graphical modeling environment is reconfigured in a manner appropriate for a particular workflow is disclosed. The workflow manager of the present invention provides hierarchical task management that is synchronized to the graphical modeling environment. The workflow manager also allows a model designer to navigate a series of steps required to achieve the goal of a particular workflow. An API allows the steps to be customized as required by the end user.

58 Claims, 15 Drawing Sheets

U.S. PATENT DOCUMENTS

| | | | |
|---|---|---|---|
| 7,412,688 B2* | 8/2008 | Liang et al. ............... 717/106 |
| 7,451,432 B2* | 11/2008 | Shukla et al. ............... 717/106 |
| 7,464,366 B2 | 12/2008 | Shukla et al. |
| 7,539,982 B2 | 5/2009 | Stuart |
| 7,703,071 B2* | 4/2010 | Kuester et al. ............... 717/104 |
| 7,849,440 B1* | 12/2010 | Englehart ............... 717/106 |
| 2002/0049960 A1* | 4/2002 | Monz et al. ............... 717/109 |
| 2002/0128890 A1 | 9/2002 | Dick et al. |
| 2003/0093575 A1* | 5/2003 | Upton ............... 709/310 |
| 2003/0095150 A1* | 5/2003 | Trevino et al. ............... 345/810 |
| 2003/0106039 A1* | 6/2003 | Rosnow et al. ............... 717/100 |
| 2003/0115545 A1 | 6/2003 | Hull et al. |
| 2004/0250238 A1* | 12/2004 | Singh et al. ............... 717/108 |
| 2005/0044529 A1 | 2/2005 | Simons et al. |
| 2006/0053172 A1* | 3/2006 | Gardner et al. ............... 707/203 |
| 2006/0064670 A1* | 3/2006 | Linebarger et al. ............... 717/106 |
| 2006/0074733 A1* | 4/2006 | Shukla et al. ............... 705/8 |
| 2006/0195817 A1* | 8/2006 | Moon ............... 717/104 |
| 2006/0242194 A1* | 10/2006 | Tsyganskiy et al. ...... 707/103 R |
| 2006/0293934 A1* | 12/2006 | Tsyganskiy et al. ............... 705/7 |
| 2007/0011334 A1 | 1/2007 | Higgins et al. |
| 2007/0067373 A1* | 3/2007 | Higgins et al. ............... 707/206 |
| 2007/0067761 A1* | 3/2007 | Ogilvie et al. ............... 717/146 |
| 2007/0157162 A1* | 7/2007 | Ciolfi ............... 717/105 |
| 2007/0261019 A1* | 11/2007 | Raghavan et al. ............... 717/105 |
| 2007/0266329 A1* | 11/2007 | Gaudette ............... 715/763 |
| 2008/0040704 A1* | 2/2008 | Khodabandehloo et al. . 717/105 |
| 2008/0092111 A1* | 4/2008 | Kinnucan et al. ............... 717/105 |
| 2008/0098349 A1* | 4/2008 | Lin et al. ............... 717/106 |
| 2008/0134140 A1* | 6/2008 | Weiner et al. ............... 717/105 |
| 2010/0050152 A1* | 2/2010 | Gilboa ............... 717/106 |
| 2011/0093835 A1* | 4/2011 | Ciolfi ............... 717/105 |

FOREIGN PATENT DOCUMENTS

| | | |
|---|---|---|
| EP | 1643435 A1 | 4/2006 |
| WO | WO-94/06074 A1 | 3/1994 |

OTHER PUBLICATIONS

Title: Workflow modelling in flexible based environments, Al-Roki, H et al , source: IEEE, dated Oct. 7, 2001.*

Springgay, Dave, "Using Perspectives in the Eclipse UI," Eclipse Corner Article, Object Technology International, Inc. (2001).

International Search Report and Written Opinion for Application No. PCT/US2007/011516, dated Jun. 10, 2008.

Nicholson, Matt, "Inside Software Factories," *DNU Online*, obtained online at http://dnjonline.com/article.aspx?ID=mar05_stevecook.

No Magic, Inc., magicdraw, user's manual, version 9.0 (2005).

European Office Action for Application No. 07809076, dated Jan. 28, 2010.

No Magic, Inc., "magicdraw™ User's Manual, version 10.5," (2005).

* cited by examiner

SYSTEM AND METHOD FOR SYNCHRONIZED WORKFLOW MANAGEMENT

FIELD OF THE INVENTION

The illustrative embodiment of the present invention relates generally to workflows in graphical modeling environments, and more particularly to a workflow manager synchronized with the graphical modeling environment.

BACKGROUND

Graphical programming languages and graphical modeling environments enable the construction of graphical models such as block diagram models, entity flow models, flow diagrams, computational noncausal models, and statechart models. Graphical programming languages provide a wide array of functionality that may be utilized during model design. Frequently there is more than one approach to solving a particular problem, achieving a particular goal, or following a proven procedure. Achieving a particular goal often requires a set of tasks that are unknown or difficult for a novice user to grasp. A workflow describes the set of tasks that must be completed in order to accomplish particular goals during the design of a graphical model.

Some conventional graphical programming languages provide tools that assist a user in identifying problems with a design and further facilitate the implementation of recommendations designed to address the problems. Unfortunately, these conventional tools provide advice that is relatively unstructured in that the advice is not closely associated with a particular portion of a workflow. Additionally these conventional tools do not tailor the graphical modeling environment for a particular task that the model designer is attempting to accomplish. It would be desirable to provide a workflow management tool that provides structured advice and is able to reconfigure the graphical modeling environment in a manner suitable for the particular workflow that is being executed by the model designer.

BRIEF SUMMARY

The illustrative embodiment of the present invention provides a workflow manager that offers structure and control over the graphical modeling environment so that the graphical modeling environment is reconfigured in a manner appropriate for a particular workflow. The workflow manager of the present invention provides hierarchical task management that is synchronized to the graphical modeling environment. The workflow manager allows a model designer to navigate a series of steps required to achieve the goal of a particular workflow. An application programming interface (API) allows the steps to be customized as required by the end user.

In one aspect of the present invention, a method of managing workflows in a graphical modeling environment includes the step of receiving user input associated with an identified workflow. The method also displays information associated with the identified workflow based on the received user input. The method additionally reconfigures the modeling environment in response to a user selection.

In another aspect of the present invention, a system for capturing task-based workflows in a graphical modeling environment includes a task-based workflow identified by a user. The system also includes user input associated with the task-based workflow. A view of information associated with the workflow based on the received user input is also part of the system. The workflow is synchronized to a modeling environment. The modeling environment of the system is reconfigured in response to a user selection.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The workflow manager of the illustrative embodiment of the present invention programmatically tailors and customizes the graphical modeling environment into a form appropriate for an identified workflow associated with a graphical model. By tailoring the graphical modeling environment to the workflow, the design process becomes more focused and efficient. The synchronization of the different views of the model design to the workflow allow the user to ascertain how design choices made at each step of the workflow affect the model components impacted by that step of the workflow. The ability to create and restore snapshots of the workflow process allows the design process to be started and stopped efficiently from a number of different points in the workflow without the need to restart the workflow from the beginning of the process.

Figure 1:
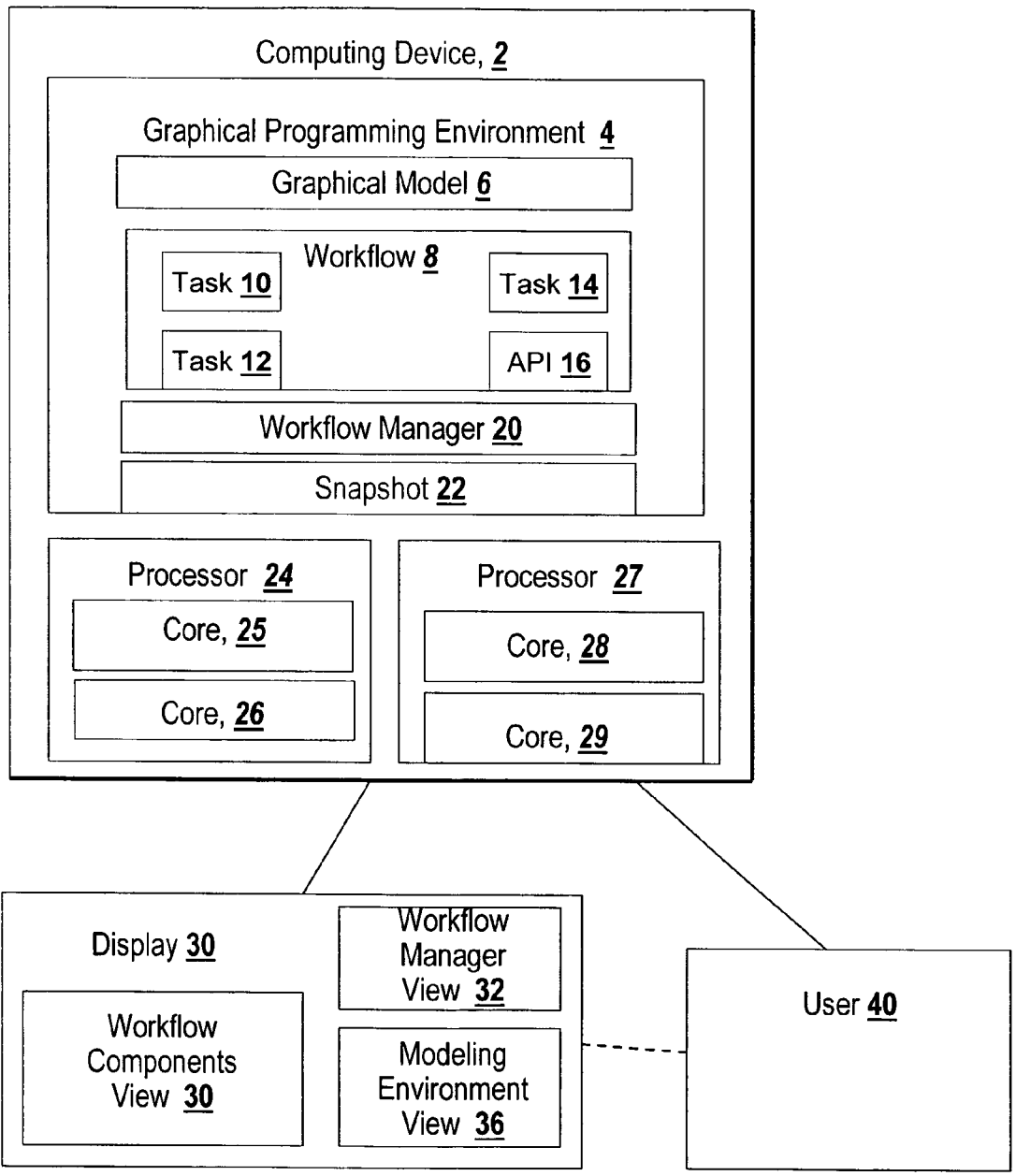
FIG. 1 depicts an environment suitable for practicing the illustrative embodiment of the present invention.

FIG. 1 depicts an environment suitable for practicing the illustrative embodiment of the present invention. A computing device 2 supports a graphical modeling environment 4. Graphical modeling environments are programs that enable a user to construct and analyze a model of a process or system.

Examples of modeling formalisms that are supported by graphical modeling tools include time-based block diagrams, such as supported by Simulink from The MathWorks Inc., discrete event diagrams and reactive state machine diagrams, such as those supported by Stateflow® from The MathWorks, Inc., data-flow diagrams, such as those supported by Lab-VIEW, available from National Instruments Corporation, entity flow modeling tools such as SimEvents, rigid body modeling tools such as SimMechanics both available from The MathWorks, Inc., and software diagrams and other graphical modeling languages, as found, for example, in Unified Modeling Language (UML) diagrams such as supported by Rational from IBM and Rhapsody from I-Logix. The computing device 2 may be a computing device such as a workstation, server, laptop, mainframe, PDA (personal digital assistant), a game platform, tablet PCs, a mobile telephone, a cluster of devices operating together, a virtual device or another computing device able to support the graphical modeling environment 4. The computing device 2 may have a single processor 24 or multiple processors 24 and 27 and the processors may be single-core processors 25 or multi-core processors 25 and 26 and 28 and 29.

The graphical modeling environment 4 includes at least one graphical model 6. The graphical modeling environment 4 also includes at least one workflow for the graphical model 6 that may be identified by a user 40. The workflow 8 may include a set of tasks 10, 12 and 14 that are required to accomplish the goal associated with the workflow. The workflow 8 may be manipulated via an API 16 that allows the user 40 to define and customize the workflow 8. The API defines and manages the workflow. The API allows one to register the specific tasks of a workflow, along with their relative order, optionally a partial order, and dependencies of tasks that, in turn, may be conditional. The API also allows one to specify the structure of the workflow along with the referential integrity between tasks (i.e., which tasks are dependent on each other). The API 16 may also allow a user to define and customize a new workflow for the graphical model 6. Exemplary workflows include a workflow for converting a model from a floating point implementation to a fixed-point implementation, a workflow for converting a model from one type of fixed point implementation to another type of fixed point implementation, a workflow for converting a model from a continuous-time implementation to a discrete-time implementation, a workflow to optimize a model to enhance simulation performance, a workflow to configure a model for optimal code generation, a workflow to instrument a model for data logging, a data management workflow, a code generation workflow, a verification and validation (V&V) workflow to assess the correctness and robustness of a design, a workflow to prepare a model for connecting with instrumentation hardware, a workflow to configure 'reconfigurable input/output (I/O)', a workflow to setup instruments and a workflow for validating the matching of model interfaces, a workflow for calibrating a model to acquired data. Those skilled in the art will recognize that many additional workflows may also be managed by the workflow manager of the present invention and that the above list is included for illustrative purposes rather than to provide an exhaustive listing of all of the workflows available to the present invention. Furthermore it will also be appreciated that a workflow may be nested within another workflow or referenced by another workflow so that the execution of a first workflow is dependent on a second workflow.

The graphical modeling environment also includes a workflow manager 20 that synchronizes the workflow to the graphical modeling environment 4 and progressively tailors the graphical modeling environment based on the current state of the workflow 8. The workflow manager 20 is discussed in further detail below. The workflow manager 20 of the present invention also allows the user 40 to create a snapshot 22 of the current state of the execution of the workflow 8. It will be appreciated that although the snapshot 22 is depicted as being stored in the graphical modeling environment 4 on the computing device 2, the snapshot may be stored in other locations accessible to the workflow manager 20 without departing from the scope of the present invention. It will be recognized by those skilled in the art that the workflow manager 20 may be integrated into the graphical modeling environment 4 as a software tool, may be a plug-in for the graphical modeling environment, or alternatively may be a separate application or process communicating with the graphical modeling environment 4.

The computing device 2 communicates with a display 30 such as a computer monitor, television set or some other type of display device. The display 30 may display a view 32 of a listing of the components affected by the identified workflow 8. The display may also display a dialog workflow manager view 34 alternately with a graphical depiction of the graphical model referred to herein as a modeling environment view 36. Exemplary modeling environment views include views of a block diagram editor, a data flow diagram editor, a text-based block inside a graphical diagram (the block may hold instructions in a dynamically typed language), a statechart, a sequence diagram, a class diagram, a physical modeling view, and a data explorer view. In other implementations, other non-visual indicators such as audio or tactile feedback indicators may be used to indicate a component affected by the task in the workflow.

Figure 2:
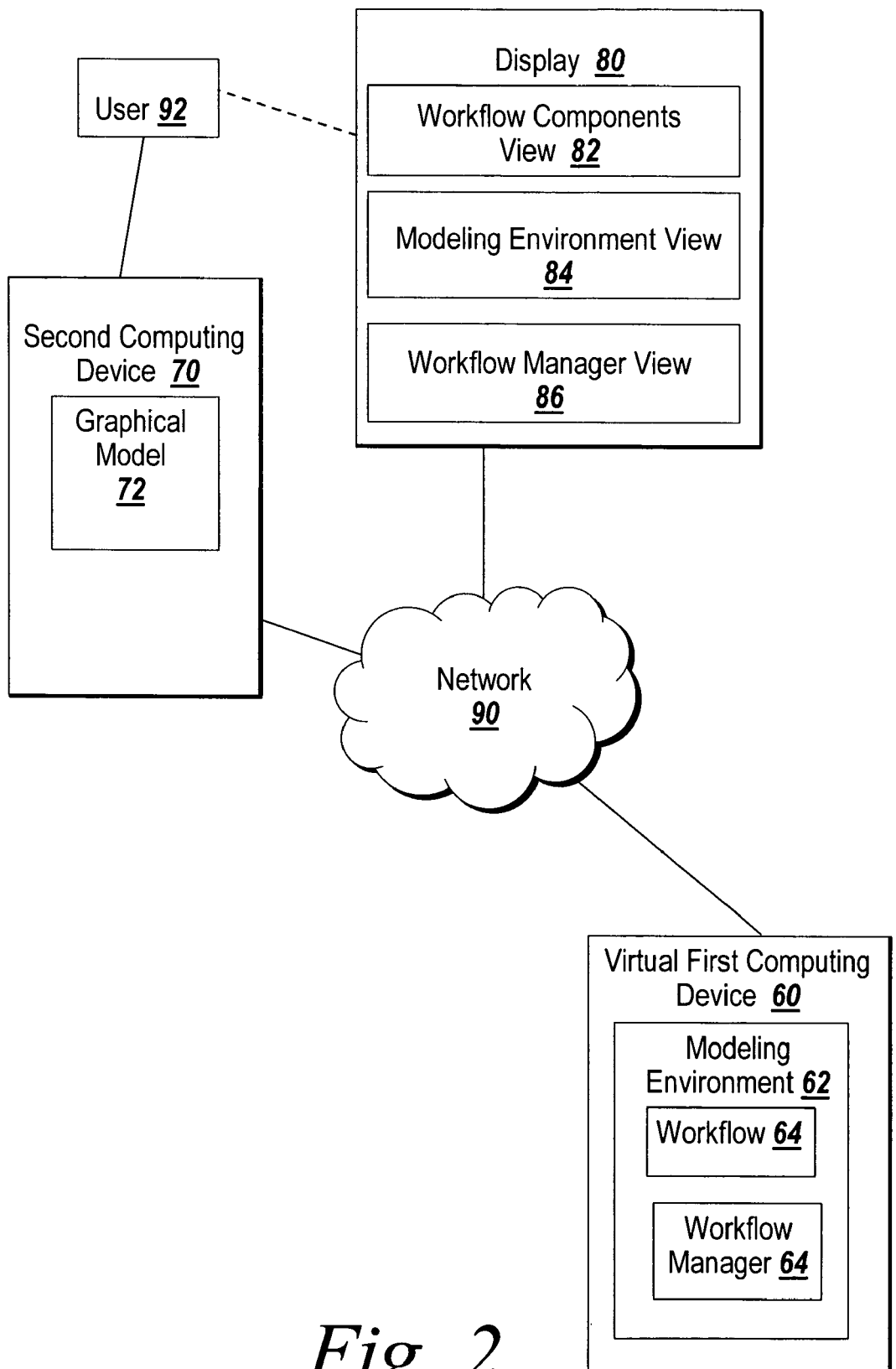
FIG. 2 depicts an alternative distributed environment suitable for practicing the illustrative embodiment of the present invention.

The workflow manager of the present invention may also be utilized in a distributed environment. FIG. 2 depicts an alternative distributed environment suitable for practicing the illustrative embodiment of the present invention. A virtualized first computing device 60 hosts a modeling environment 62. It will be appreciated that the first computing device 60 could also be a physical device. The modeling environment 62 includes at least one workflow 64 that is associated with a graphical model and the workflow manager 66. In other implementations, the workflow manager 66 may be in communication with, or integrated into, additional third-party workflow tools. A user 92 accesses a second computing device 70 to communicate over a network 90 with the modeling environment 62 on the first computing device 60. The network 90 may be the Internet, a local area network (LAN), a wide area network (WAN), a wireless network, an intranet, an extranet or some other type of network. The second computing device 72 may include a graphical model 72 that is transmitted by the user 92 to the modeling environment 62. In another implementation, the workflow 64 may be located on the second computing device 70 while the graphical model 72 is located on the first computing device. Alternatively, both the workflow 64 and the graphical model 72 may be located in the modeling environment 62. In an alternative implementation, a server may be used to download code to be executed on a client device in order to practice the illustrative embodiment of the present invention. Other alternative distributed architectures in addition to those discussed here will be apparent to those skilled in the art and are considered to be within the scope of the present invention.

The second computing device 70 is in communication with a display 80 upon which the output of the modeling environment 62 (which is transmitted over the network 90) may be displayed to the user 92. The display 80 may include a workplace component view 82, a modeling environment view 84 and the workflow manager dialog view 86. The different views 82, 84 and 86 may be displayed simultaneously, singly or in various combinations.

The workflow manager 20 of the present invention tailors the graphical modeling environment by synchronizing the model components with the workflow and eliminating or otherwise indicating which components are associated with the current step of the workflow and which are extraneous. It will be appreciated that more than one workflow may be active at a time (and synchronized with the modeling environment) by the workflow manager 20. When more than one workflow is active at a time, the workflows may share data as well as control. In order to better explain the workflow manager 20, FIGS. 3A-6B provides a series of screenshots which illustrate the usage and functionality of the workflow manager in a SIMULINK environment. It will be appreciated that the workflow manager 20 of the present invention may be employed in many different graphical modeling environments in addition to a SIMULINK environment.

Figure 3A:
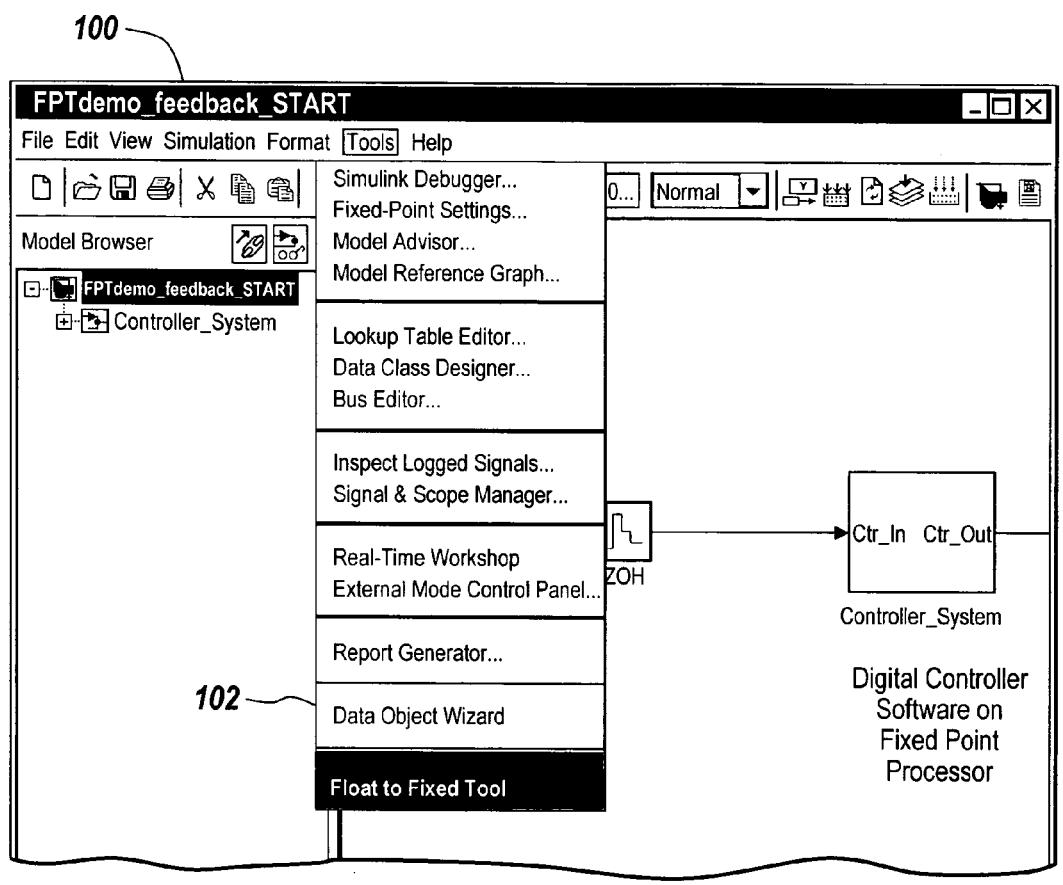
FIG. 3A depicts a screenshot of the selection of a user-identified workflow.

FIG. 3A depicts the initialization of the workflow manager for a SIMULINK model with a particular goal in mind, the execution of a workflow converting a floating point SIMULINK model to a fixed-point equivalent. The screenshot 100 shows the user selecting an identified workflow 102 from a menu option. It will be appreciated that other mechanisms for selecting a provided workflow from the graphical modeling environment 4 may be utilized within the scope of the present invention. Alternatively, the user may provide the workflow to the graphical modeling environment by providing a location of a stored workflow rather than selecting the workflow from a menu option.

The workflow may be stored in a database or a file. The workflow may be stored in an XML format. The workflow may be subjected to version control as well as configuration control (as a workflow can reference other workflows). The stored workflows may be subjected to differencing and merging operations. Furthermore, documentation of the workflow can be generated, for example in portable document format (PDF), POWERPOINT (PPT), or Hypertext Markup Language (HTML) format, which may show the workflow structure, conditions, requirements, configuration actions, etc. The documentation may be in a textual format or a graphical format. Moreover, a (partial) workflow may be constructed from a file. For example, a number of slides in POWERPOINT (from Microsoft Corporation of Redmond, Wash.) can be imported and converted into a workflow (framework), including the branching points that POWERPOINT facilitates. In the case of a partial workflow (e.g., a workflow framework or template), a workflow editor may be used to supply missing details. The completed workflow may then be exported back to the original or another file format.

Figure 3B:
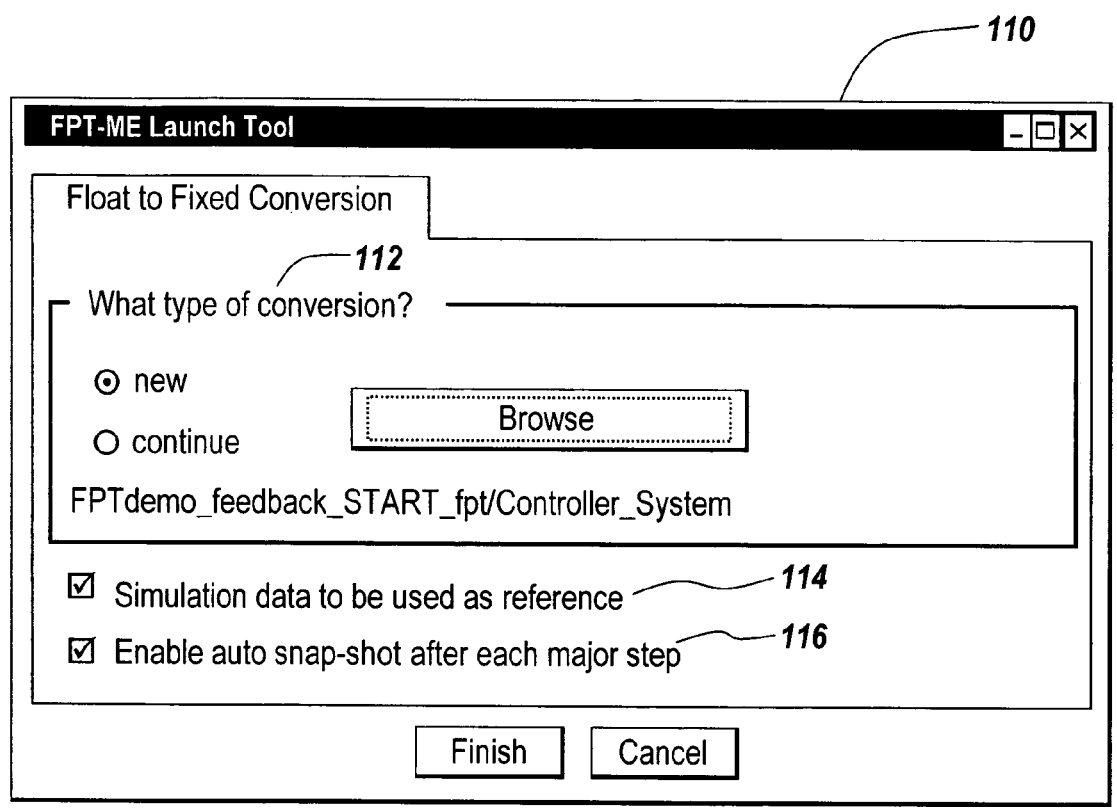
FIG. 3B depicts a screenshot of the solicitation of user input by the workflow manager in order to simplify the chosen workflow.
Figure 3C:
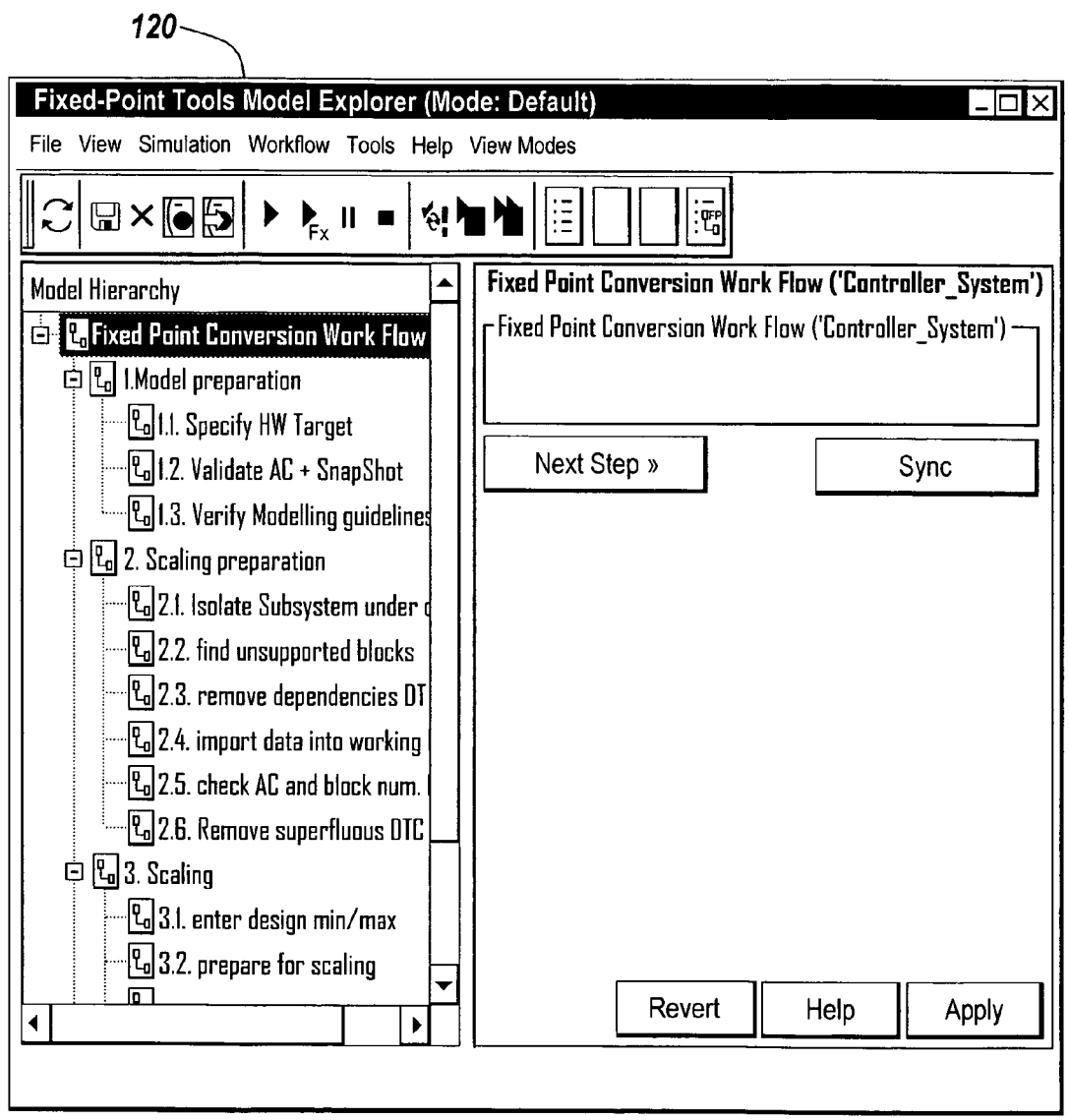
FIG. 3C depicts a screenshot of a hierarchical view of the tasks relevant to the identified workflow and based on the user input solicited in FIG. 3B.

FIG. 3B depicts a screenshot 110 of the querying performed by the workflow manager 20 in an attempt to simplify the workflow steps. Thus, the user is questioned to determine whether the conversion is new or a continuation 112, whether simulation data is to be used as a reference 114 and whether a feature that takes an automatic snapshot after each major step should be enabled 116. It will be appreciated that the substance of the queries will vary according to the nature of the workflow. FIG. 3C depicts a screenshot of the workflow manager 20 presenting a hierarchical workflow view 122 showing the hierarchy of steps/tasks required by the workflow. The workflow in FIG. 3C is a streamlined workflow based on the information provided above along with any customization to the workflow through the API discussed below. The workflow is streamlined in that it includes the necessary tasks based on the user input indicating that simulation data is available. If the user response to the queries had not indicated that simulation data was to be used, then those tasks associated with the simulated data would be removed from the workflow. The workflow is synchronized to the modeling environment. The workflow manager can act on any portion or the entirety of a model or models including the content of links such as model reference blocks and library blocks. In the example depicted in FIG. 3C, the workflow is targeted to the "Controller_System" portion of the model. It should be noted that a tree view of the workflow tasks is just one aspect of the invention. Alternate methods of presenting the workflow are possible: for example, as a flow chart, state diagram, directed graph, with or without cycles or other graphical view.

A workflow may contain active parts so that once a workflow is selected, it may do whatever tasks it can automatically before relinquishing control to the user. Or, performing certain tasks automatically can be invoked when a user has prepared a model up to a certain point within one workflow stage. For example, once a sample rate is selected for the overall model and a desired solver that satisfies prerequisites, the workflow can invoke an automatic discretization of continuous time blocks. Before this discretization, it may also be required that the user removes incompatible blocks. Also, selecting a workflow may automatically select certain configuration options (e.g., for code generation).

Figure 3D:
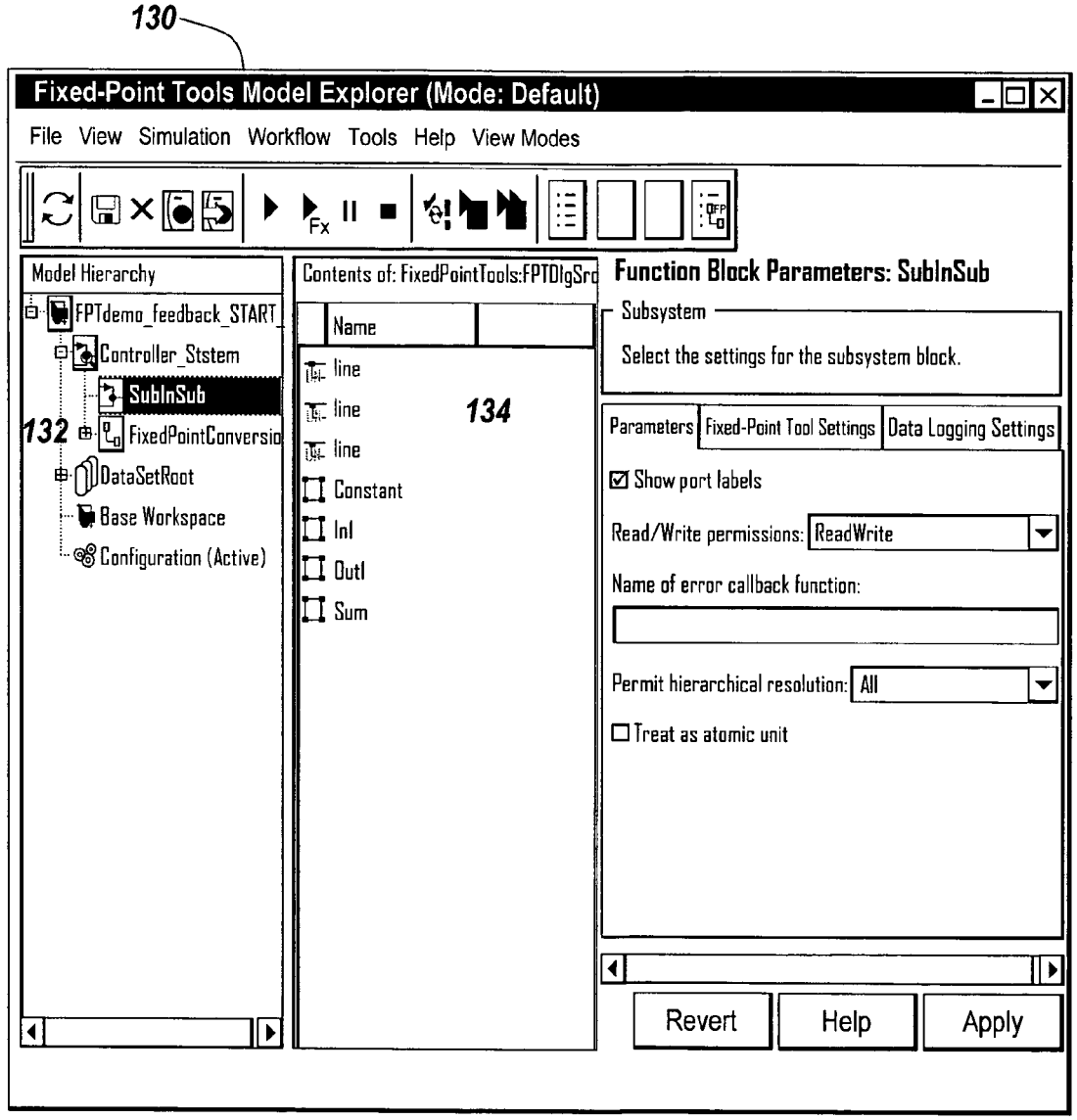
FIG. 3D depicts the model environment in a default configuration.
Figure 3E:
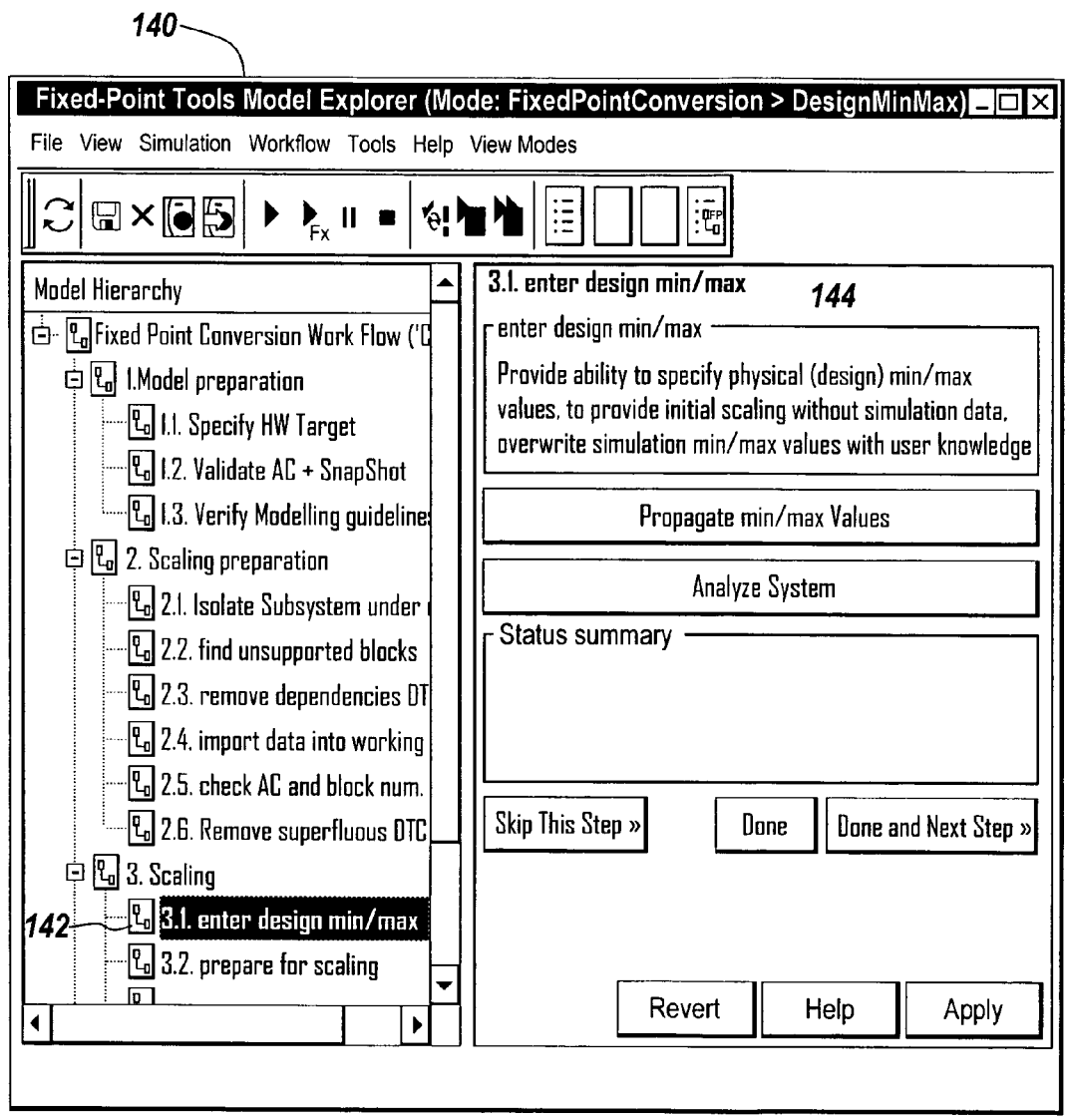
FIGS. 3E-3F depict a screenshot of a user selection of a particular step in the presented workflow and the subsequent reconfiguring of the graphical modeling environment to show the relevant portions of the model.
Figure 3F:
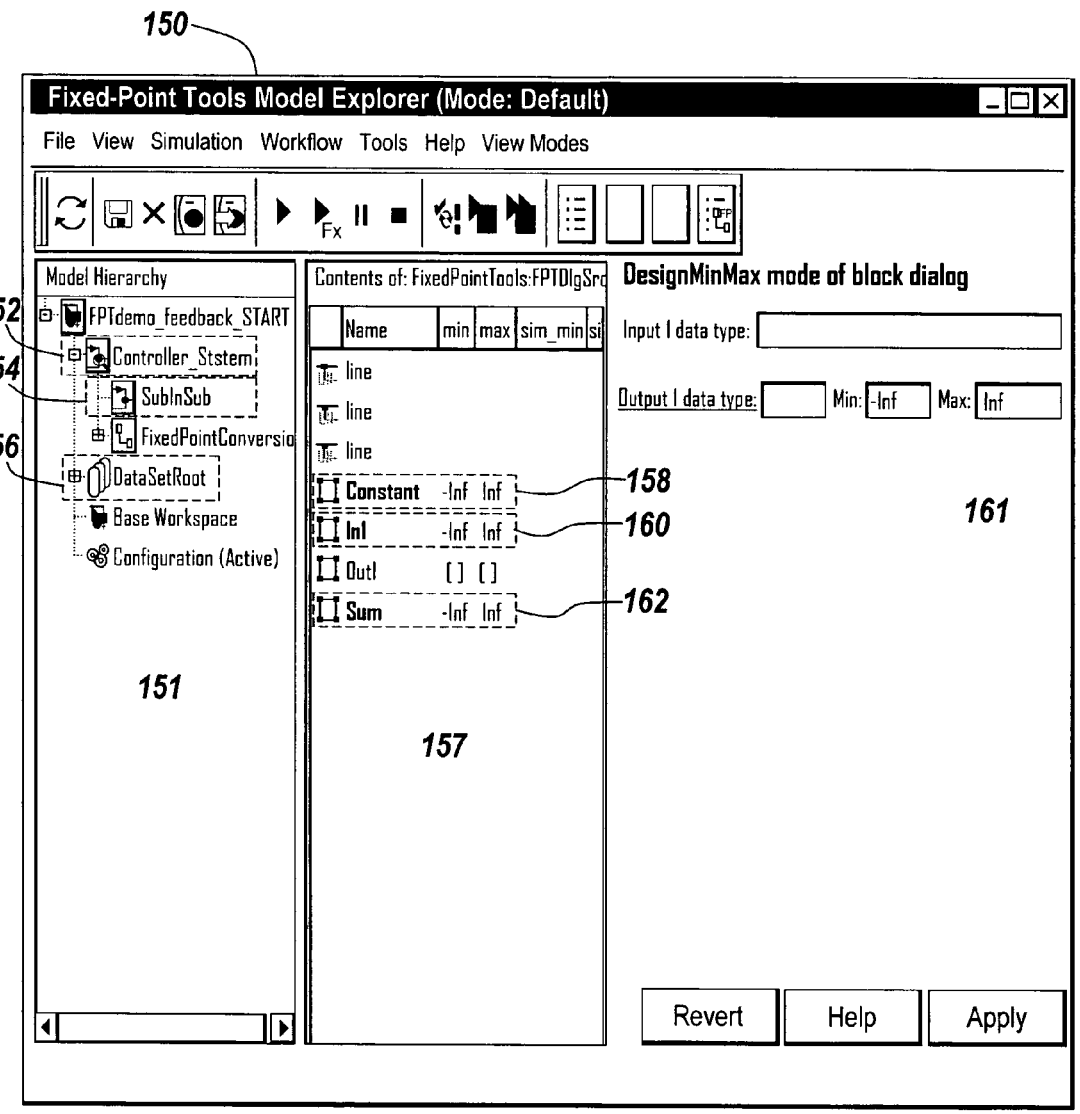

The workflow manager 20 provides a hierarchical description of the steps necessary to complete a specific task. One aspect of the present invention is that the workflow manager 20 is synchronized to the modeling environment in a way that reconfigures the entire modeling environment (or select portions of the modeling environment if desired) specific to the task at hand. For example, the workflow manager 20 may reconfigure libraries or a set of blocks available for usage. The workflow manager 20 may also be coupled to a modeling style guideline so that selecting a workflow will result in a particular modeling style guideline being used. As another example of the synchronization of the modeling environment with the workflow, the screenshot 130 of FIG. 3D depicts the model environment in a default configuration when no particular step is selected. The default view includes a listing 134 of the graphical model components, in the case of the present example these components are blocks and connections from the block diagram model. After the selection and expansion of the fixed point conversion workflow 132 and a selection of the step 142 for entering a design min/max as depicted in the screenshot 140 of FIG. 3E, the model environment is reconfigured by the workflow manager. The workflow manager presents a new window pane 144 that includes information related to the current step. The workflow manager synchronizes the workflow step to the alternate views in the modeling environment. Thus FIG. 3F depicts a screenshot 150 that provides indicators (in this example broken lines) showing which components 158, 160 and 162 are affected by the current step in the workflow in the model contents pane 157 and which parts 152, 154 and 156 of the model hierarchy are associated with the current step in the workflow in a model hierarchy pane 151. The workflow manager also provides an additional workflow manager view dialog 161 that requests additional information from the user for the particular step. It will be appreciated that the selection of other steps in the workflow would reconfigure the environment specific to that task. For example, the step "prepare for scaling" will reconfigure the modeling environment to display views where data type and scaling information is applicable. The manner and extent to which the environment is reconfigured between tasks is up to the workflow author. The corresponding modeling environment view depicted in the screenshot 170 of FIG. 3G also graphically indicates which model components 172, 174 and 176 in the block diagram model are affected by the current step in the workflow. The synchronized information provides the designer with a better understanding of the effect of his design choices on the model than is possible with conventional tools.

The workflow manager tailors the graphical modeling environment based upon the current stage in the execution of the workflow. The configuration and arrangement of the environment can change for specific tasks or be shared among tasks, which may be configured within the workflow API. The workflow manager analyzes each workflow step to identify which components in the current model are affected by the current step's execution. For example, if the workflow calls for the alteration of a "sum" block in a block diagram model, the workflow manager can analyze the block diagram model to determine which other blocks are affected, directly or indirectly in a change in the sum block. Each of those blocks and the sum block would then be identified for the user. The author of a particular workflow determines the requirements of each task in a workflow, and programs the workflow via the workflow API. The workflow API allows the author to include analysis, visualization, actions, and artifact archival for each task in the workflow.

Figure 3G:
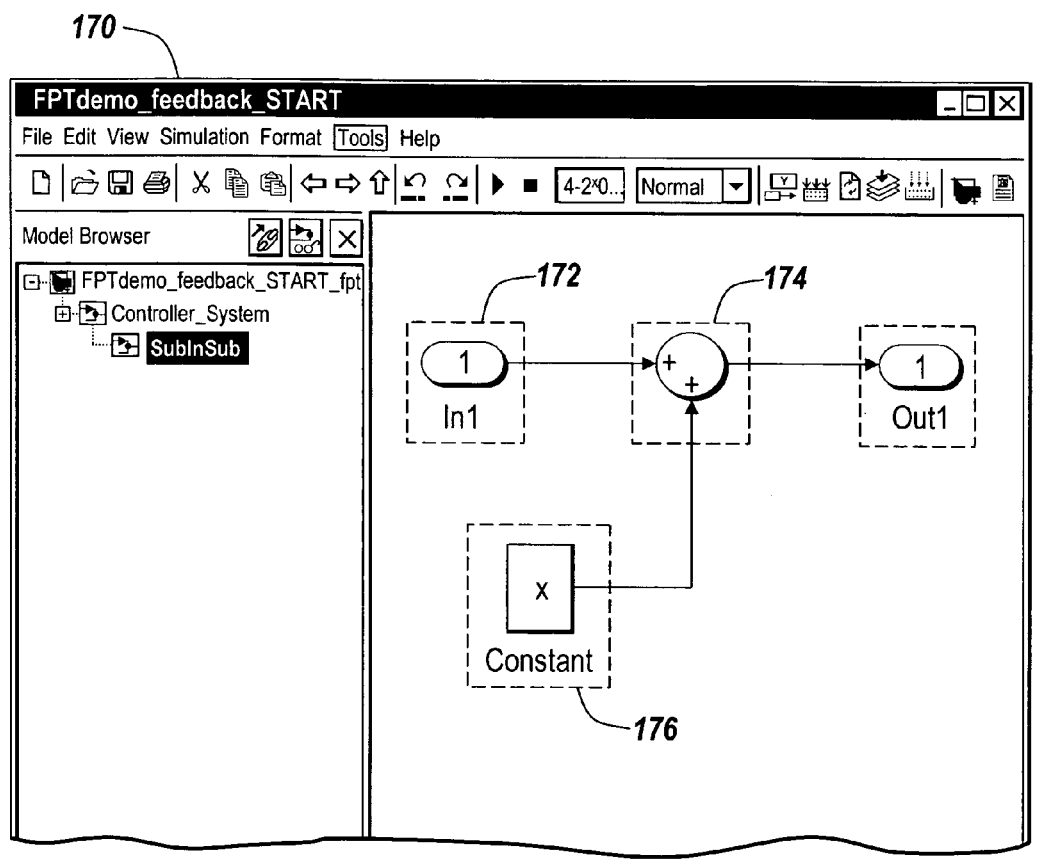
FIG. 3G depicts a screenshot of the graphical model editor highlighted to show the model components relevant to a task.
Figure 3H:
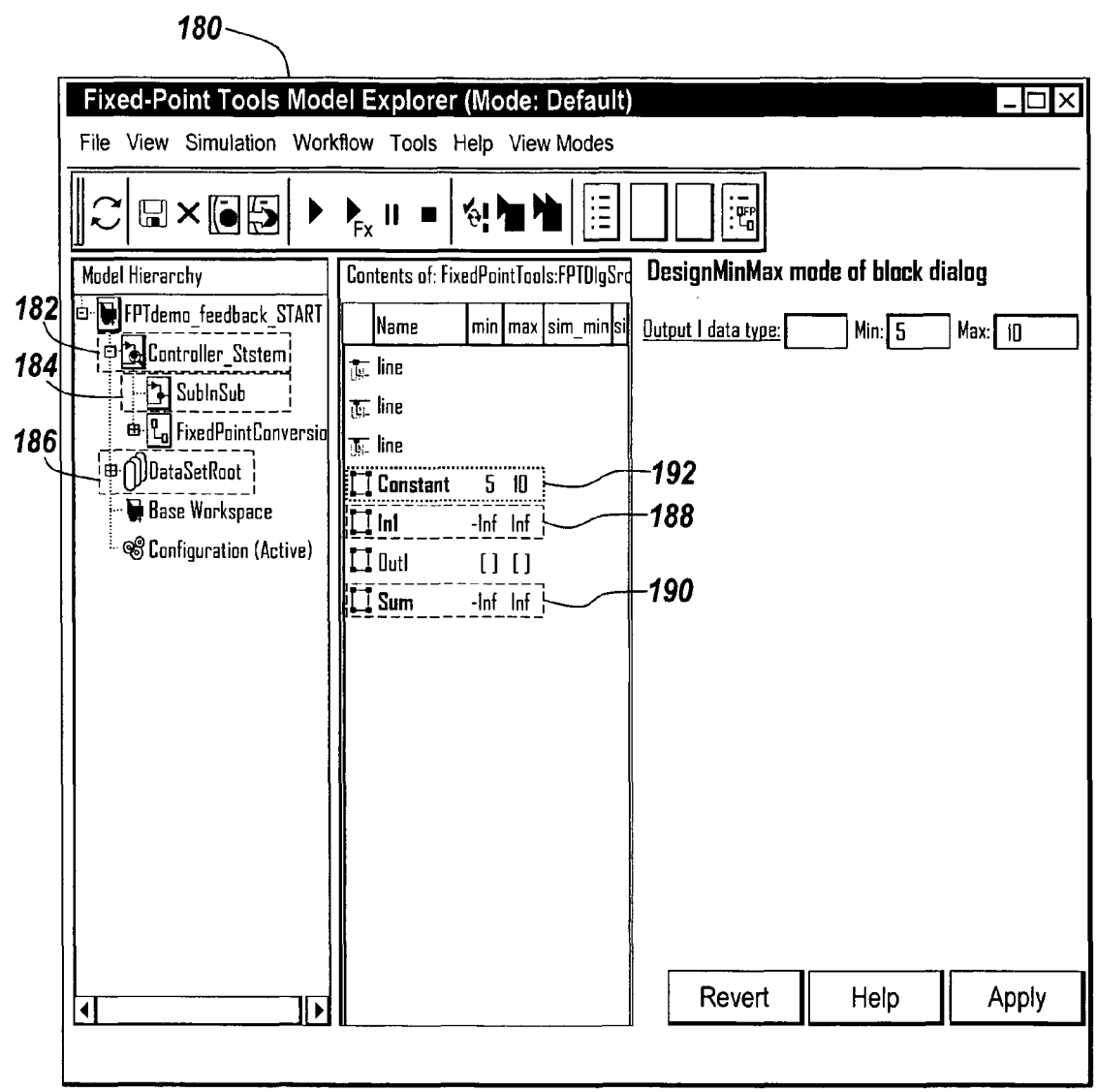
FIGS. 3H and 3I depict screenshots of the workflow manager reconfiguring the model hierarchy and graphical model editor respectively to show progress towards the completion of a task required in the identified workflow.
Figure 3I:
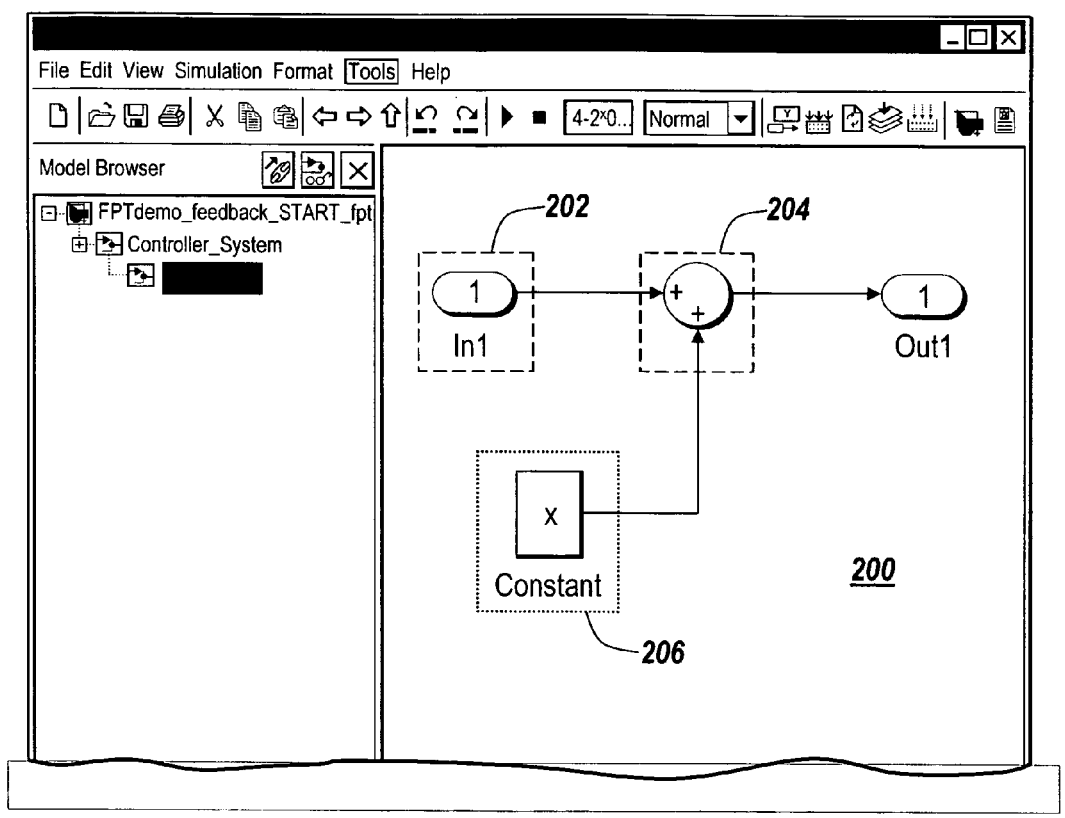

Although FIGS. 3F and 3G use dashed lines surrounding the components to indicate components affected by the current step in the workflow, it should be appreciated that a number of different mechanisms may be used to indicate the affected components. For example, the intensity of the component or component label may be varied to indicate that a particular component is or is not affected by a current step in the workflow. Thus affected components and/or component labels may be displayed in the graphical modeling environment in bold or with increased intensity while non-affected components may be grayed out or simply not shown in a particular view. Alternatively, the components and/or component labels may be displayed using different colors to indicate which model components are affected by the current step in the workflow. It will be appreciated that many different types of indicators may be used within the scope of the present invention.

Another aspect of the workflow manager of the present invention is its ability to show progression toward a goal. For example, once the min/max values in the previous example are entered, the modeling environment provides feedback. That is, as information is entered into the modeling environment for a specific task the result is reflected visually. This allows the user to know what tasks are done and which are remaining. For example, the workflow manager may alter the display so that when the "Min" and "Max" values are entered for "Constant" during the "enter design min/max" an icon turns from yellow (meaning not done) to green (meaning done). Alternatively as depicted in the screenshot 180 of FIG. 3H, the constant label 192 may be surrounded by dotted lines to indicate the value has been entered while model hierarchy elements 182, 184 and 186 and model contents 188 and 190 are surrounded by dashed lines indicating that the workflow is not done with them yet. A similar depiction is shown in the graphical modeling view of FIG. 3I where block diagram element 206 (the constant block) is surrounded by dotted lines to indicate completion in the workflow while block diagram elements 202 and 204 are surrounded by dashed lines to indicate their lack of completion. As noted above, color, display intensity or other forms of indicators may be substituted for those shown herein.

Figure 4:
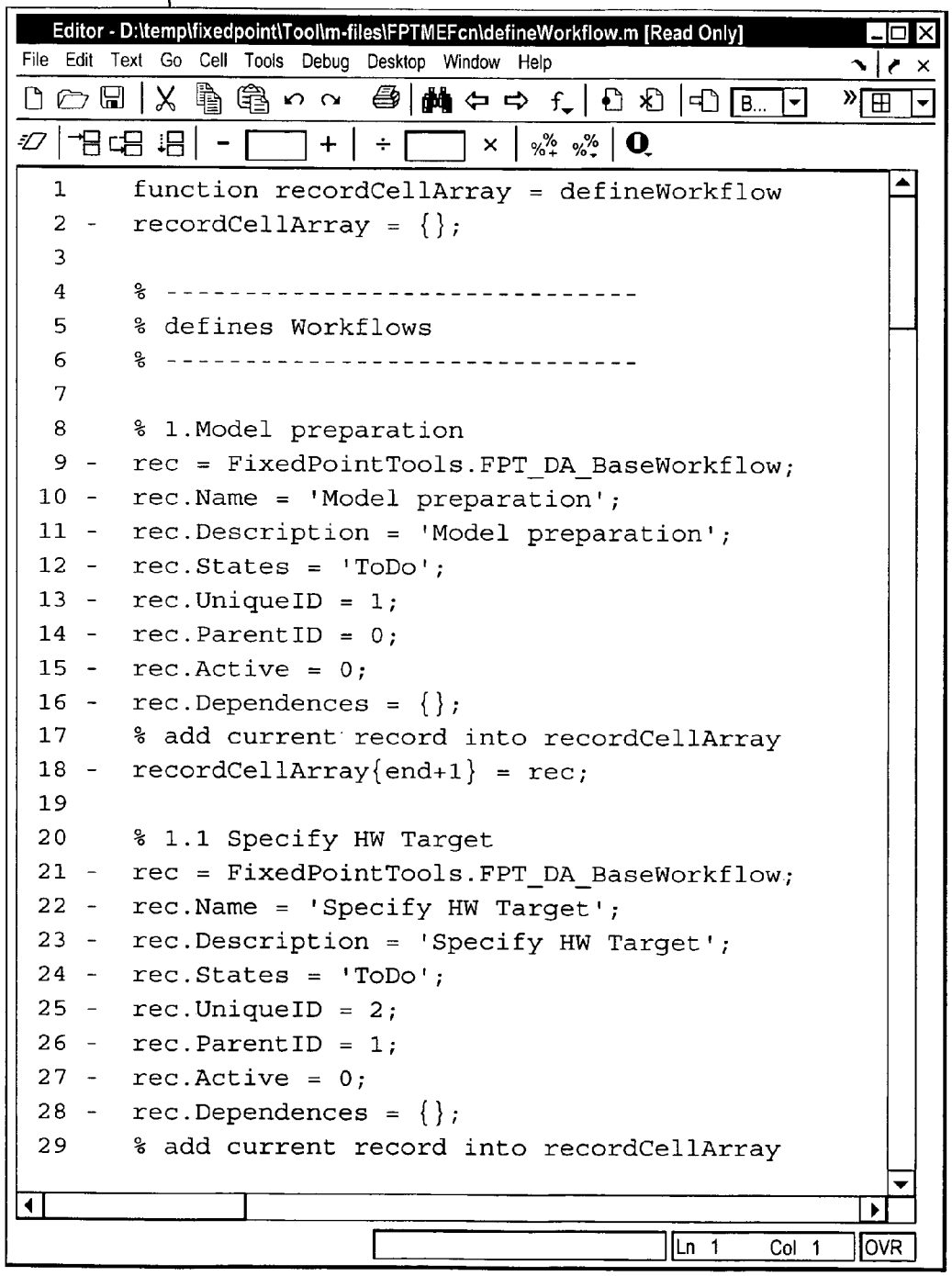
FIG. 4 shows a workflow that may be defined and customized through a provided API.

In one aspect of the present invention, the workflow may reference a programmatic API that allows a user to add custom workflows, to add and remove steps from existing workflows and to perform other tasks. In an exemplary implementation, the API is implemented using a MATLAB (from The MathWorks, Inc of Natick, Mass.) programming interface, but many other implementations are possible within the scope of the present invention. FIG. 4 shows a screenshot 300 of a workflow that may be defined and customized through a provided API. The provision of an API allows a user to define and customize a workflow that synchronizes and controls the layout of the graphical environment. The order of tasks is controlled through the API as well as the dependencies between tasks. For example, if task 2.3 depends on task 1.2, that information can be specified which allows the workflow manager to prevent progress on task 2.3 until task 1.2 is complete. In addition, the API allows a user to specify connectivity to other workflows as well as types of people conducting the workflow. This is important since it allows a lower-level workflow to be reused by more than one higher-level workflow, which may involve more than one user.

Workflow navigation items can be superimposed on the model. For example, a 'forward' and 'backward' button may be present on the model canvas. The appearance of the navigation items, and the workflow in general, can be designed using graphical editing environments that have a set of workflow specific operations (for example, forward, backward, and checkpoint operations) available for drag and drop design. The graphical modeling environment may then operate in two different modes: one for editing the workflow and the appearance to the model designer and another where the workflow is affected. The workflow manager may also be used in conjunction with templatized workflows (or parameterized workflows) and workflow fragments that represent a portion of a larger workflow.

The workflows created and/or altered via the API perform a number of functions. The workflow collects input from the user and performs requested actions. Additionally, the workflow archives measurements, results, and/or data produced by the user input and/or requested actions. The workflow may thus be used to not only achieve a goal but also to produce the necessary artifacts to prove a goal was met. The proof of completion may meet a standard such as DO-178B. Additionally, the workflow and its associated API allow the workflow author to specify which tasks should be validated against acceptance criteria. Acceptance criteria are established for a model prior to conducting a workflow. Many types of acceptance criteria are possible depending on the goals of the workflow or application needs. For example, a typical acceptance criterion is to check that the model can still be compiled after a change to the model. Another example acceptance criterion is that the simulation result matches a specified baseline after a change to the model. In other words, as the user perform tasks within the workflow, the model changes and is therefore continuously validated against a set of acceptance criteria. The acceptance criteria and the workflow may be specified using object constraint language (OCL).

Acceptance criteria may be represented as a separate unique node in the workflow tree. Acceptance criteria include two types of acceptance criteria, workflow author-defined acceptance criteria and user-defined acceptance criteria The workflow author would determine if user-defined acceptance criteria is required. Acceptance criteria has 'levels'; e.g. mandatory or desired. Tasks may register which acceptance criteria they have to pass in order to be register as passing.

Figure 5:
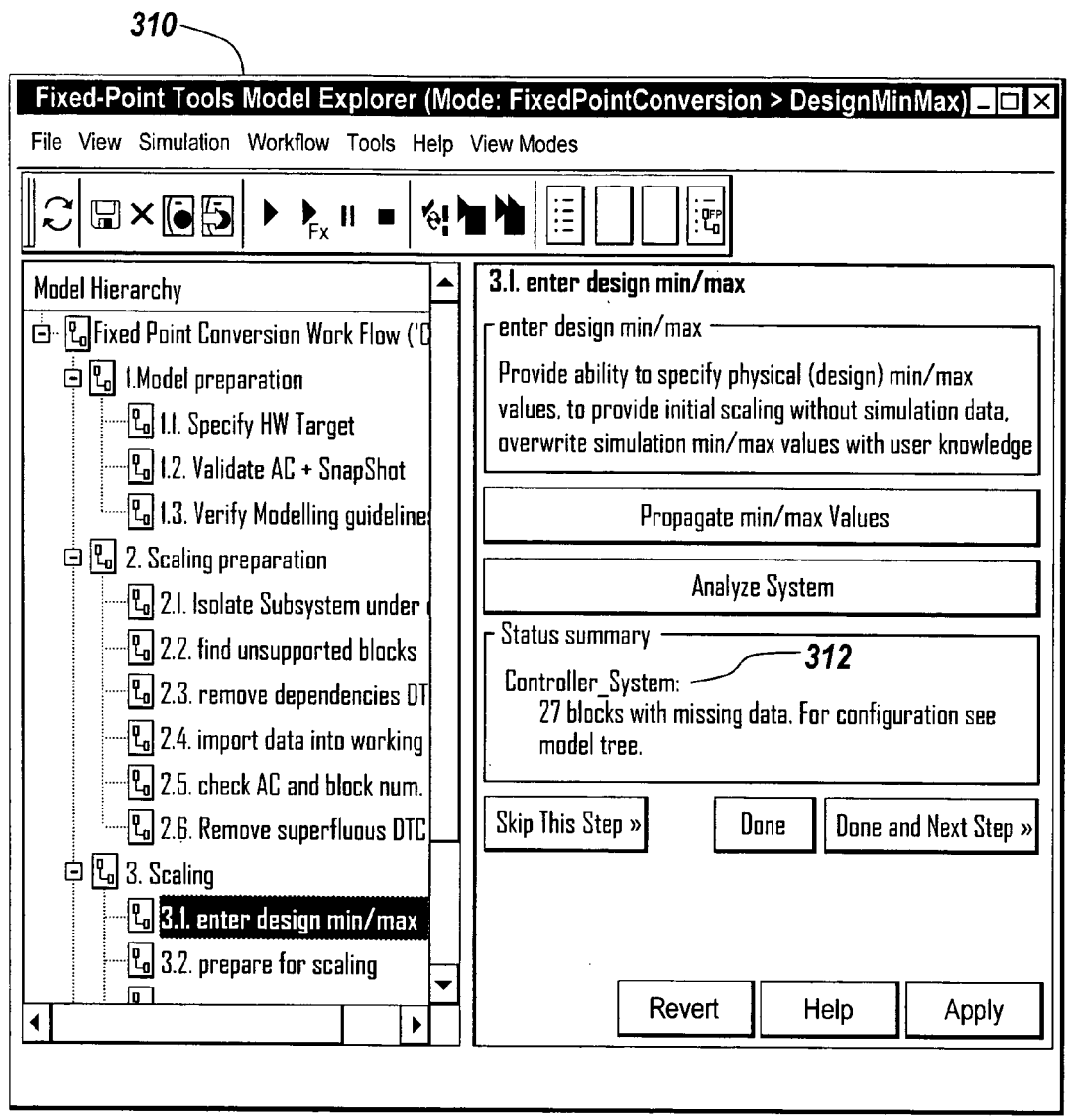
FIG. 5 depicts one aspect of the reporting capability of the workflow manager.

The workflow manager of the present invention also provides reporting capability to indicate to a user how much work remains to be done. This reporting can be output in a variety of methods including but not limited to HTML and PDF reports, for example, or directly in the workflow manager itself. The screenshot 310 in FIG. 5 depicts the workflow manager displaying a "Status summary" 312 that indicates that "27" blocks in the model require min/max data.

In another aspect of the present invention, the workflow manager allows a user to create "snapshots" that represent the current state of execution of the workflow. The snapshot captures both workflow information entered by the user and model information. The snapshot includes all of the data necessary to recreate the exact state of the model and its workflow. Snapshots can be saved and restored thus saving the user the time and effort of recreating an interrupted workflow. Additionally, the snapshot feature allows a user to experiment with various design choices with the knowledge that the user will be able to "back out" the choices to an earlier saved restore point captured by a saved snapshot. Saving and restoring snapshots of a workflow is important since this allows the user to explore a solution space for an optimal result. In one implementation, the full state of the workflow captured in a snapshot is saved as a persistent file on the computer hard drive for later restoration. It will be appreciated that the snapshot may also be saved on other storage mediums accessible to the graphical modeling environment and the workflow manager.

The present invention may also be used to facilitate workflow data logging. Workflow data logging can track how long it took to complete a task, how many times did the user select 'undo', how many blocks were changed, what the number of blocks used was, which configuration changes were made, how often the model was simulated, and many other workflow related tasks. This information can be stored in a centralized database with the results being scored. Future workflow selection can be based on the scoring of the data logs and/or changes to the existing workflow can be made based on scores associated with a data log.

Figure 6A:
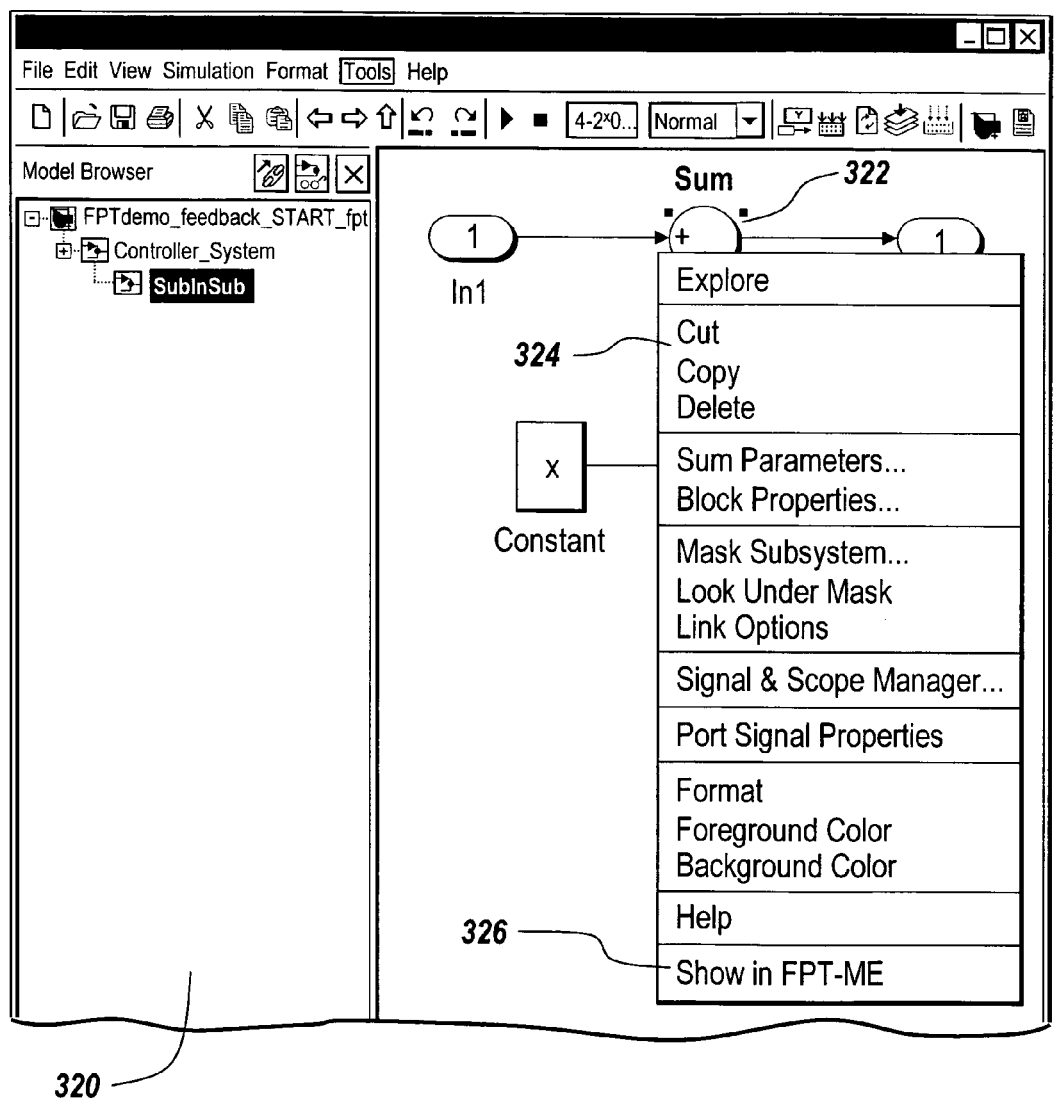
FIGS. 6A and 6B depict the bi-directional linkage provided by the present invention between a block diagram editor and model explorer view.
Figure 6B:
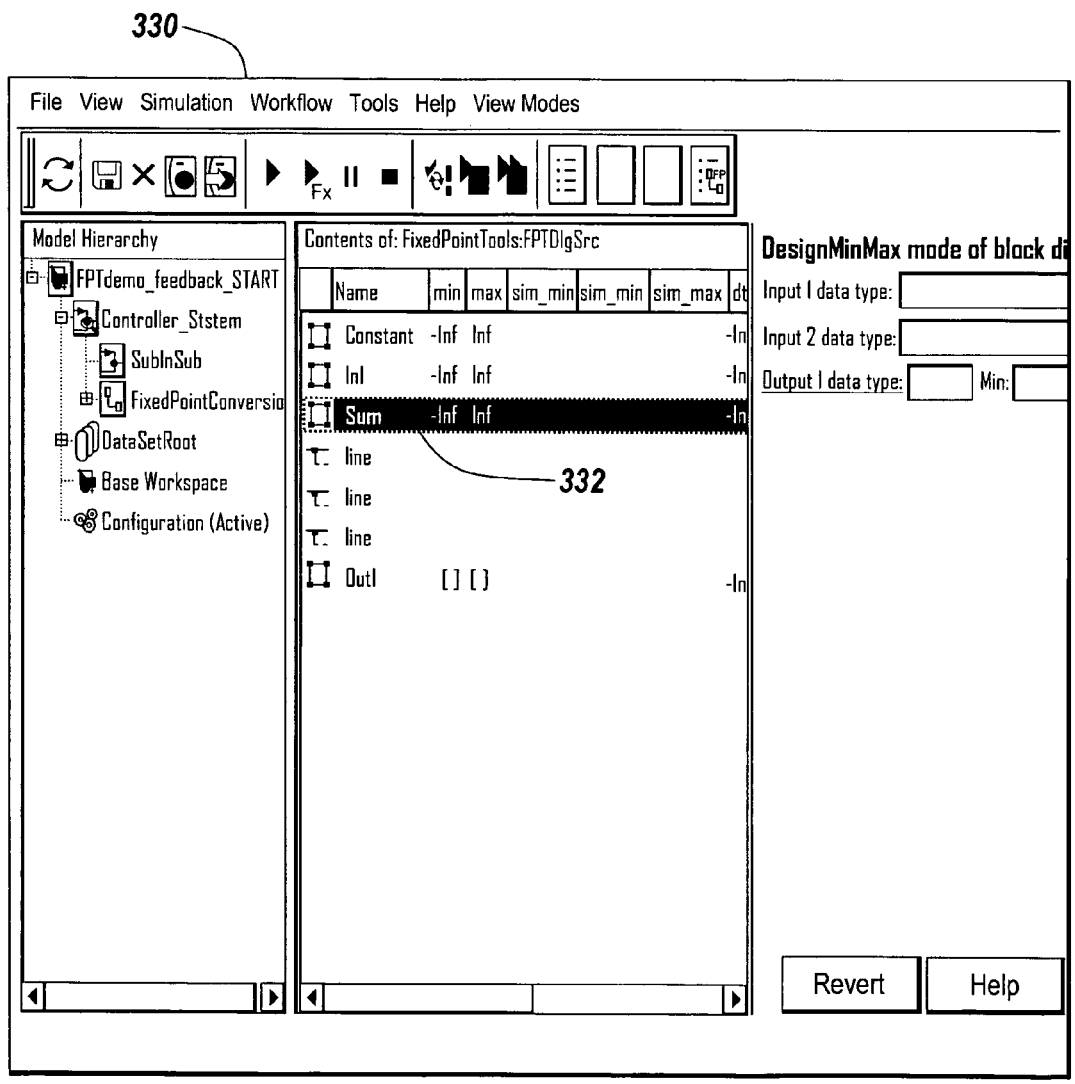

The present invention provides bi-directional linkage from the graphical modeling environment view such as a block diagram view to a hierarchical view of corresponding objects in the workflow. Bi-directional linkage between components of a modeling environment is important since the optimal realization of an action in a workflow is task dependent. The workflow manager initially guides the user to the most optimal component for realizing a task. However the user may choose to navigate to a different component for a variety of reasons such as understanding the problem context better, configuring in a component more familiar to them, etc. For example, a user can navigate from the block diagram to the component view for a task that requires action. FIGS. 6A and 6B depict the bi-directional linkage provided by the present invention between a block diagram editor and component view. The screenshot 320 in FIG. 6A shows the block diagram model associated with the identified workflow. By right clicking (or otherwise selecting) a user causes a pull down menu 324 to be displayed which includes the option 326 of navigating directly to the component view of the components affected by the current task. FIG. 6B shows a screenshot 330 of the corresponding component view, which includes a listing of the sum block 332, to which the user navigates. In other words, the selection by the user of the "Show in FPT-ME" context menu selection 326 for the "Sum" block requiring action brings the user to the same point in the component view for making the desired changes.

As will be apparent from the above discussion, the workflow manager of the present invention is capable of reconfiguring many different types of views in the modeling environment including a graphical modeling editor view, a model hierarchy view showing the hierarchy of the graphical model, which can be the nesting of graphical entities but could also be the nesting of functionality (which is different in case of virtual graphical nesting), a model dependencies view that shows the elements in the model environment that it depends upon such as initialization scripts, header files with data structures, referenced models, and referenced binaries, a compiled model view that shows the model properties after all degrees of freedom such as data type, dimensions, and sample rate have been determined (which may lead to inserting functional units that could be graphically depicted), a model requirements view that shows the requirements of the model that are compiled in a text based document such as a free-form text document or a spreadsheet, but potentially also superimposed on the model as determined by hotlinks between model entities and specific requirements, a model coverage view that shows the model aspects that have been evaluated and how comprehensively they have been evaluated during one or a number of simulations (for example, condition coverage or modified condition/decision coverage, MC/DC), a model simulation results view, a model debugging view that shows values internal to the execution computations and that allows halting the execution at desired points in the flow of computations required for execution, a model profiling view that shows the computational expense of the model entities as established during one or multiple simulation runs, and a contents editor view.

In one aspect of the present invention, the workflow manager synchronizes a dynamically configurable workflow with the modeling environment. For a dynamically configurable workflow, the workflow may be adapted during the design activities. A change in workflow may be predicated upon certain user activity. Instead of a static set of activities, the set of activities becomes dynamically selected. So, if a user selects a nonlinear element to be added to the graphical model, the workflow may be dynamically changed to require a linearization step. This may be based on simulation results as well.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, Python, FORTRAN, C, C++, C#, or JAVA. The software programs may be stored on or in one or more mediums as object code. Hardware acceleration may be used and all or a portion of the code may run on a FPGA, an ASIC, a graphics processing unit (GPU), or any other piece of computational hardware, including analog, such as, for example, a configurable printed circuit board. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer implemented method comprising:
   identifying a workflow associated with a simulatable model of a process or a system provided in a modeling environment based on a received input, the workflow including one or more steps for completing one or more tasks to manipulate the simulatable model;
   providing a set of acceptance criteria for the simulatable model being modeled in the modeling environment;
   specifying at least one task in a workflow associated with the simulatable model as requiring validation against the acceptance criteria;
   displaying one or more steps of the identified workflow; and
   reconfiguring at least a portion of the modeling environment in response to a selected step of the displayed one or more steps of the workflow, the reconfiguring including:
      providing information, associated with a portion of the simulatable model, that is required for the selected step of the workflow.

2. The method of claim 1 wherein reconfiguring at least a portion of the modeling environment further comprises:
   reconfiguring the modeling environment to graphically indicate one or more model elements associated with the selected step.

3. The method of claim 2, wherein graphically indicating one or more model elements associated with the selected step further comprises at least one of:
   modifying a display color of at least one model element associated with the selected step, and
   altering a display intensity property for at least one model element associated with the selected step.

4. The method of claim 1 wherein reconfiguring at least a portion of a modeling environment further comprises displaying at least one of: a graphical modeling editor view, a model hierarchy view, a model dependencies view, a compiled model view, a model requirements view, a model coverage view, a model simulation results view, a model debugging view, a model profiling view, and a contents editor view.

5. The method of claim 1, wherein the reconfiguring of the modeling environment further comprises altering a view generated by the modeling environment to indicate a progression towards completion of the identified workflow.

6. The method of claim 5 wherein the modeling environment is altered to display completed items in the identified workflow in a first color and incomplete items in the identified workflow in a second color.

7. The method of claim 1 wherein the identified workflow is selected by a user from a menu.

8. The method of claim 1, further comprising:
   providing an application programming interface (API) that allows an addition of at least a second workflow to the modeling environment, both the second workflow and the identified workflow being simultaneously active in the modeling environment.

9. The method of claim 1, further comprising:
   providing an API that allows a creation of a new workflow associated with the simulatable model being modeled in the modeling environment.

10. The method of claim 1, further comprising:
    providing an API that allows an altering of an existing workflow.

11. The method of claim 10, wherein the altering of the existing workflow comprises one or a combination of: adding a step to the existing workflow, deleting a step from the existing workflow, an ordering of tasks in the workflow, a changing of the dependencies of tasks in the workflow, a setting of a permission level for at least one of a user or type of user to execute the workflow, an addition of an indication of a relationship to at least one other workflow, highlighting model elements, and an altering of an existing indication of a relationship to at least one other workflow.

12. The method of claim 1 wherein one of the set of acceptance criteria or an alteration to the set of acceptance criteria are specified using an API associated with the workflow.

13. The method of claim 1 further comprising:
    performing a task in the workflow; and
    validating the simulatable model against the set of acceptance criteria.

14. The method of claim 1, further comprising:
    providing a report indicating an amount of incomplete work in the workflow.

15. The method of claim 14 wherein the report is displayed in a workflow manager.

16. The method of claim 1, further comprising:
    saving a snapshot of a state of the identified workflow, the snapshot including at least one of a collection of current workflow information and a collection of current model information.

17. The method of claim 16, further comprising:
    restoring the state saved in the snapshot in the graphical modeling environment.

18. The method of claim 1, further comprising:
    linking bi-directionally components in different views of the graphical modeling environment, the bi-directional linkage allowing navigation from a first component in one view to a corresponding component in a second view.

19. The method of claim 1 wherein the identified workflow is one or a combination of: a workflow converting a model from a floating point implementation to a fixed-point implementation, a workflow converting a model from one type of fixed point implementation to another type of fixed point implementation, a workflow converting a model from a continuous-time implementation to a discrete-time implementation, a workflow to optimize a model to enhance simulation performance, a workflow to configure a model for optimal code generation, a workflow for instrumenting a model for data logging, a data management workflow, a code generation workflow, a verification and validation workflow, a workflow calibrating against collected data, a workflow for validating the matching of model interfaces, a workflow to prepare a model for connecting with instrumentation hardware, a workflow to configure 'reconfigurable I/O', and a workflow to setup instruments.

20. The method of claim 1 wherein the reconfiguring of the model environment further comprises:
    reconfiguring one or more of: a block diagram editor, a data flow diagram editor, a text-based block inside a graphical diagram, a statechart, a sequence diagram, a class diagram, a physical modeling view, and a data explorer view.

21. The method of claim 1 wherein the reconfiguring of the model environment reconfigures one or more of: a spreadsheet view, a GUI, a tree view, a block, a state, a library, a user dialog, a signal that is input into or output from an element of a model in the modeling environment, a dependency view, a text-based editor, an application environment, a system environment, and a transition.

22. The method of claim 1 wherein the identified workflow is a hierarchical task-based workflow.

23. The method of claim 1 wherein the identified workflow is depicted using one of the group of: graphics and text.

24. The method of claim 23 wherein the identified workflow is represented by one of a flowchart and state chart.

25. The method of claim 1 wherein the identified workflow generates an artifact proving the completion of at least one task within the workflow.

26. The method of claim 1, further comprising:
synchronizing the workflow to the modeling environment.

27. A system comprising:
a processor for:
receiving input in connection with a task-based workflow associated with a simulatable model of a process or a system provided in a modeling environment, the workflow including one or more steps for completing one or more tasks to manipulate the simulatable model,
receiving a set of acceptance criteria for the simulatable model being modeled in the modeling environment;
receiving input specifying at least one task in a workflow associated with the simulatable model as requiring validation against the acceptance criteria;
adding one or more tasks to or deleting one or more tasks from the task-based workflow based on the received input,
displaying a view of one or more tasks of the task-based workflow, and
reconfiguring the modeling environment based on a selection of a task in the view, the reconfiguring including:
providing information, associated with a portion of the simulatable model, that is required for the selected task.

28. The system of claim 27 wherein the task-based workflow is a hierarchical task-based workflow.

29. The system of claim 27 wherein the modeling environment includes at least one of: a block diagram editor, a data flow diagram editor, a text-based block inside a graphical diagram, a statechart, a sequence diagram, an entity flow diagram, a class diagram, a physical modeling view, and a data explorer view.

30. The system of claim 27 wherein the processor further generates at least one snapshot of a current state of the task-based workflow, the snapshot including at least one of a collection of current workflow information and a collection of current model information.

31. A computer-readable storage medium storing computer-executable instructions for providing a task manager, the instructions comprising one or more instructions for:
identifying a workflow associated with a simulatable model of a process or a system provided in a modeling environment based on a received-input, the workflow including one or more steps for completing one or more tasks to manipulate the simulatable model;
providing a set of acceptance criteria for the simulatable model being modeled in the modeling environment;
specifying at least one task in a workflow associated with the simulatable model as requiring validation against the acceptance criteria;
displaying one or more steps of the identified workflow; and
reconfiguring at least a portion of the modeling environment in response to a selected step of the displayed one or more steps of the workflow, the reconfiguring including:
providing information, associated with a portion of the simulatable model, that is required for the selected step of the workflow.

32. The computer-readable storage medium of claim 31 wherein reconfiguring at least a portion of the modeling environment further comprises:
reconfiguring the modeling environment to graphically indicate one or more model elements associated with the selected step.

33. The computer-readable storage medium of claim 32 wherein graphically indicating one or more model elements associated with the selected step further comprises:
modifying a display color of at least one model element associated with the selected step.

34. The computer-readable storage medium of claim 32 wherein the instructions further comprise one or more instructions for:
graphically indicating in the modeling environment the one or more elements associated with the selected step by altering a display intensity property for the one or more elements.

35. The computer-readable storage medium of claim 31 wherein a view generated by the modeling environment includes at least one of a graphical modeling editor view, a model hierarchy view, a model dependencies view, a compiled model view, a model requirements view, a model coverage view, a model simulation results view, a model debugging view, a model profiling view, and a contents editor view.

36. The computer-readable storage medium of claim 31 wherein the reconfiguring of the modeling environment includes altering a view generated by the modeling environment to indicate a progression towards completion of the identified workflow.

37. The computer-readable storage medium of claim 36 wherein the modeling environment is altered to display one or more completed items in the identified workflow in a first color and one or more incomplete items in the identified workflow in a second color.

38. The computer-readable storage medium of claim 31 wherein the identified workflow is selected by a user from a menu.

39. The computer-readable storage medium of claim 31 wherein the instructions further comprise one or more instructions for:
providing an application programming interface (API) that allows an addition of at least a second workflow to the modeling environment, both the second workflow and the identified workflow being simultaneously active in the modeling environment.

40. The computer-readable storage medium of claim 31 wherein the instructions further comprise one or more instructions for:
providing an API that allows a creation of a new workflow.

41. The computer-readable storage medium of claim 31 wherein the instructions further comprise one or more instructions for:
providing an API that allows an altering of an existing workflow.

42. The computer-readable storage medium of claim 41, wherein the altering comprises one or a combination of: adding a step to the existing workflow, deleting a step from the existing workflow, an ordering of tasks in the workflow, a changing of the dependencies of tasks in the workflow, a setting of a permission level for at least one of a user or type of user to execute the workflow, an addition of an indication of a relationship to at least one other workflow, and an altering of an existing indication of a relationship to at least one other workflow.

43. The computer-readable storage medium of claim 31 wherein one of the set of acceptance criteria or an alteration to the set of acceptance criteria are specified using an API associated with the workflow.

44. The computer-readable storage medium of claim 31 wherein the instructions further comprise one or more instructions for:
performing a task in the workflow; and
validating the simulatable model against the set of acceptance criteria.

45. The computer-readable storage medium of claim 31 wherein the instructions further comprise one or more instructions for:
providing a report indicating an amount of incomplete work in the workflow.

46. The computer-readable storage medium of claim 45 wherein the report is displayed in a workflow manager.

47. The computer-readable storage medium of claim 31 wherein the instructions further comprise one or more instructions for:
saving a snapshot of a state of the identified workflow, the snapshot including at least one of a collection of current workflow information and a collection of current model information.

48. The computer-readable storage medium of claim 47 wherein the instructions further comprise one or more instructions for:
restoring the state saved by the snapshot in the graphical modeling environment.

49. The computer-readable storage medium of claim 31 wherein the instructions further comprise one or more instructions for:
linking bi-directionally components in different views of the graphical modeling environment, the bi-directional linkage allowing navigation from a first component in one view to a corresponding component in a second view.

50. The computer-readable storage medium of claim 31 wherein the identified workflow is one or a combination of: a workflow converting a model from a floating point implementation to a fixed-point implementation, a workflow converting a model from one type of fixed point implementation to another type of fixed point implementation, a workflow converting a model from a continuous-time implementation to a discrete-time implementation, a workflow to optimize a model to enhance simulation performance, a workflow to configure a model for optimal code generation, a workflow for instrumenting a model for data logging, a data management workflow, a code generation workflow, a verification and validation workflow, a workflow calibrating against collected data, a workflow for validating the matching of model interfaces, a workflow to prepare a model for connecting with instrumentation hardware, a workflow to configure 'reconfigurable I/O', and a workflow to setup instruments.

51. The computer-readable storage medium of claim 31 wherein the reconfiguring of the model environment further comprises reconfiguring one or more of: a block diagram editor, a data flow diagram editor, a text-based block inside a graphical diagram, a statechart, an entity flow diagram, a sequence diagram, a class diagram, a physical modeling view, and a data explorer view.

52. The computer-readable storage medium of claim 31 wherein the reconfiguring of the model environment reconfigures one or a combination of: a spreadsheet view, a GUI, a tree view, a block, a state, a library, a user dialog, a signal that is input into or output from an element of a model in the modeling environment, a dependency view, a text-based editor, an application environment, a system environment, and a transition.

53. The computer-readable storage medium of claim 31 wherein the identified workflow is a hierarchical task-based workflow.

54. The computer-readable storage medium of claim 31 wherein the identified workflow is depicted using one of the group of: graphics and text.

55. The computer-readable storage medium of claim 54 wherein the identified workflow is one of a flowchart and state chart.

56. The computer-readable storage medium of claim 31 wherein the identified workflow generates an artifact proving the completion of at least one task within the workflow.

57. The computer-readable storage medium of claim 31 wherein the instructions further comprise one or more instructions for:
synchronizing the workflow with the modeling environment.

58. An apparatus comprising:
a processor for:
identifying a workflow associated with a simulatable model of a process or a system provided in a modeling environment based on a received input, the workflow including one or more steps for completing one or more tasks to manipulate the simulatable model;
providing a set of acceptance criteria for the simulatable model being modeled in the modeling environment;
specifying at least one task in a workflow associated with the simulatable model as requiring validation against the acceptance criteria;
displaying one or more steps of the identified workflow; and
reconfiguring at least a portion of the modeling environment in response to a selected step of the displayed one or more steps of the workflow, the reconfiguring including:
providing information, associated with a portion of the simulatable model, that is required for the selected step of the workflow.

* * * * *

UNITED STATES PATENT AND TRADEMARK OFFICE
CERTIFICATE OF CORRECTION

PATENT NO. : 8,181,150 B2
APPLICATION NO. : 11/432939
DATED : May 15, 2012
INVENTOR(S) : Peter Szpak et al.

It is certified that error appears in the above-identified patent and that said Letters Patent is hereby corrected as shown below:

Title page, item (56): References Cited, Other Publications, Column 2, line 19, "souce" should be --source-- before IEEE.

Signed and Sealed this
Twenty-eighth Day of August, 2012

David J. Kappos
*Director of the United States Patent and Trademark Office*